July 15, 1924.

D. S. BACHELDER

BRACE FOR FENDERS

Filed Oct. 6, 1922

1,501,834

WITNESSES

INVENTOR
D. S. Bachelder
BY
ATTORNEYS

Patented July 15, 1924.

1,501,834

UNITED STATES PATENT OFFICE.

DAVID S. BACHELDER, OF DECATUR, ILLINOIS.

BRACE FOR FENDERS.

Application filed October 6, 1922. Serial No. 592,840.

*To all whom it may concern:*

Be it known that I, DAVID S. BACHELDER, a citizen of the United States of America, and a resident of Decatur, in the county of Macon and State of Illinois, have invented a new and Improved Brace for Fenders, of which the following is a description:

My invention relates to a brace or truss adapted to be applied to an automobile to extend across the same and across the fenders thereof and secured to the latter for bracing the same.

The general object of my invention is to provide a brace for the indicated purpose of simple construction and which may be applied with facility to the fenders or readily detached therefrom by one person and of a character to prevent rattling or vibration of the fenders as well as to prevent them from sagging onto the wheels of the automobile.

Reference is to be had to the accompanying drawings forming a part of this specification, it being understood that the drawings are merely illustrative of one example of the invention.

Figure 1:
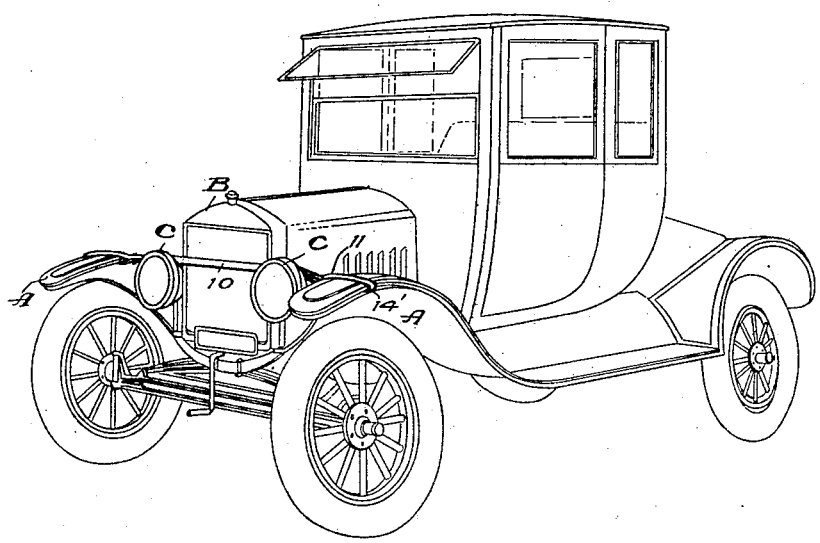
Figure 1 is a perspective view of an automobile having my improved brace applied to the fenders thereof.
Figure 2:
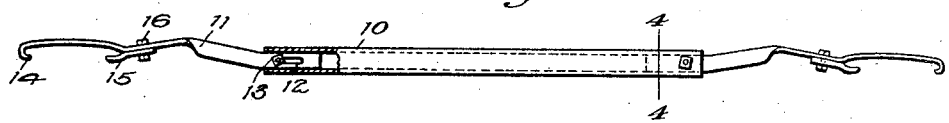
Figure 2 is a front elevation of my improved brace with a portion broken out.
Figure 3:
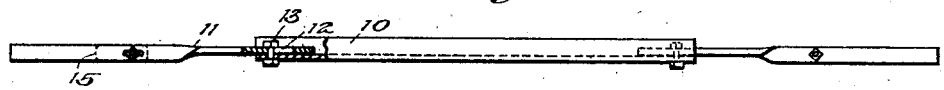
Figure 3 is a plan view of said brace with a portion broken out.
Figure 4:
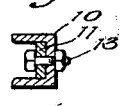
Figure 4 is a cross section indicated by the line 4—4, Figure 2.
Figure 5:
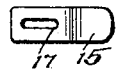
Figure 5 is a plan view of one of the clamp members employed on the brace for engaging the fender.

In carrying out my invention in practice an elongated bar 10 is provided having clamps at the ends thereof designated generally by the numeral 11, said bar and clamps adapted to be positioned across an automobile as for example in front of the radiator B so that the clamps engage the fenders A and extend across the same. The letter C indicates the headlights of the automobile.

Each clamp 11 consists of an arm separate from the bar 10 and the latter bar is in practice of channel form receiving at each end the inner end of clamp 11. Clamp arms 11 each have a longitudinal slot 12 and the bolt 13 passes through the same and through the arm 11 whereby the arm may be adjusted longitudinally of the bar 10 to accord with the distance between the fenders A.

At the outer end the arm 11 terminates in an inturned hook 14 adapted to engage the outer edge of the fender, the outer portion of the arm 11 lying across the fender A on top of the same. On the under side of the arm 11 is a coacting clamp member 15 having a slot 17 receiving a securing bolt 16 passing through said slot and through the arm 11. The clamp element 15 is offset at its outer end and disposed in a direction toward the inturned hook end 14.

With the described construction with the bar 10 placed across the automobile and with the arms 11 resting on the fenders A the inturned ends 14 of arms 11 are engaged with the outer edges of the fenders. Clamp elements 15 are now adjusted to engage the fenders A at the inner edges, whereby the fenders are clamped firmly to the arms 11. The arms 11 are now adjusted to draw the fenders slightly toward each other sufficiently to render the fenders rigid. The bolts 13 are tightened up to hold the parts in a given adjustment. The fenders are thus firmly trussed and prevented from rattling as well as from sagging onto the automobile.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claim.

Having thus described my invention, I claim:

A fender brace for automobiles, comprising a channel bar adapted to extend transversely of the forward portion of a motor vehicle with its channel facing the vehicle and the closed side facing outward, arms having a half twist intermediate of their ends, whereby the outer ends of the bars will be presented flatwise and the inner ends edgewise, the outer ends of the bars terminating in downwardly extending hooks for engaging the outer edges of the fenders, the inner ends of the bars having longitudinal slots and extending into the ends of the channel and lying against the closed side thereof, bolts passing through the channel bar and the slots of the arms, longitudinally slotted clamping members lying against the underside of the arms and having offset outer ends for engaging the inner edges of the fenders, and bolts passing through the arms and the slots of the clamping members.

DAVID S. BACHELDER.